United States Patent
Shahin et al.

(10) Patent No.: US 12,385,536 B2
(45) Date of Patent: Aug. 12, 2025

(54) DISK BRAKE SYSTEM WITH SINGLE-SIDED PRESSURE APPLICATION

(71) Applicant: HL MANDO CORPORATION, Pyeongtaek-si (KR)

(72) Inventors: Hatem Shahin, Pfaffenhofen (DE); Lothar Wagner, Simmern (DE); Kai Braun, Friedrichsdorf (DE)

(73) Assignee: HL MANDO CORPORATION, Gyeonggi-Do (KR)

( * ) Notice: Subject to any disclaimer, the term of this patent is extended or adjusted under 35 U.S.C. 154(b) by 354 days.

(21) Appl. No.: 17/994,633

(22) Filed: Nov. 28, 2022

(65) Prior Publication Data
US 2023/0167866 A1 Jun. 1, 2023

(30) Foreign Application Priority Data
Nov. 26, 2021 (DE) .................... 102021213374.6

(51) Int. Cl.
*B62L 1/00* (2006.01)
*F16D 55/22* (2006.01)
(Continued)

(52) U.S. Cl.
CPC ......... *F16D 65/0972* (2013.01); *F16D 55/22* (2013.01); *F16D 65/125* (2013.01);
(Continued)

(58) Field of Classification Search
CPC ................. F16D 65/0972; F16D 65/18; F16D 65/125–128; F16D 2121/04
(Continued)

(56) References Cited

U.S. PATENT DOCUMENTS 2,740,503 A * 4/1956 Wesa ................... F16D 65/827
188/264 R
3,498,417 A * 3/1970 Franz ..................... B60T 1/062
192/111.15
(Continued)

FOREIGN PATENT DOCUMENTS

DE 2504224 A1 8/1975
DE 2635035 A1 2/1977
(Continued)

OTHER PUBLICATIONS

Office action issued in German application 10 2021 213 374.6 dated Feb. 17, 2023 with English Translation.
(Continued)

*Primary Examiner* — Christopher P Schwartz
(74) *Attorney, Agent, or Firm* — LEE, HONG, DEGERMAN, KANG & WAIMEY

(57) ABSTRACT

The invention relates to a disk brake system for a vehicle, with single-sided pressure application, comprising a brake disk (1) comprising a hub portion (1.1) and a friction ring (1.2), a friction surface (1.3) of the friction ring (1.2) extending between an inner circumferential edge (1.4) and an outer circumferential edge (1.5) of the friction ring (1.2), a housing (2) with at least one piston (3, 3', 3") for actuating a first brake pad (4), the first brake pad (4) being configured to be pressed against the friction surface (1.3) of the friction ring (1.2) for braking, the disk brake system being devoid of an opposing brake pad opposite to the first brake pad (4). The invention also relates to a vehicle comprising at least one brake system of this type.

13 Claims, 32 Drawing Sheets

Figure 1:
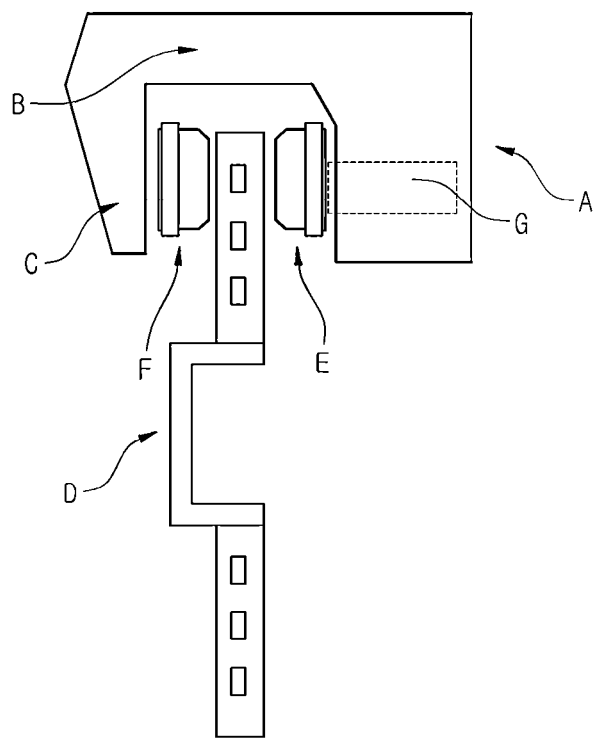

(51) Int. Cl.
   *F16D 65/097* (2006.01)
   *F16D 65/12* (2006.01)
   *F16D 65/18* (2006.01)
   *F16D 121/04* (2012.01)

(52) U.S. Cl.
   CPC ........... F16D 65/128 (2013.01); F16D 65/18 (2013.01); *F16D 2121/04* (2013.01)

(58) Field of Classification Search
   USPC ................ 188/17, 18 A, 26, 218 XL, 264 A, 188/264 AA
   See application file for complete search history.

(56) References Cited

U.S. PATENT DOCUMENTS

| | | | |
|---|---|---|---|
| 3,971,457 A | 7/1976 | Campagnolo | |
| 4,056,172 A * | 11/1977 | Campagnolo | F16D 55/02 |
| | | | 188/26 |
| 4,062,427 A * | 12/1977 | Klaue | B62L 1/02 |
| | | | 188/26 |
| 4,226,304 A * | 10/1980 | Erdmann | F16D 65/123 |
| | | | 301/6.9 |
| 4,874,064 A * | 10/1989 | Oono | B60T 1/065 |
| | | | 192/70.15 |
| 6,328,137 B1 * | 12/2001 | Rancourt | F16D 65/0006 |
| | | | 188/73.31 |
| 10,006,512 B2 * | 6/2018 | Tai | F16D 65/095 |
| 11,945,543 B2 * | 4/2024 | Ortmann | A63C 17/1427 |
| 2011/0290602 A1 * | 12/2011 | Kleber | F16D 65/12 |
| | | | 188/218 XL |

FOREIGN PATENT DOCUMENTS

| | | | | |
|---|---|---|---|---|
| DE | 2753753 A1 | 6/1979 | | |
| DE | 20002512 U1 * | 6/2001 | ................ | B62L 1/00 |
| DE | 10343055 A1 | 5/2005 | | |
| DE | 102018118517 A1 | 2/2020 | | |
| KR | 10-2017-0132993 A | 12/2017 | | |

OTHER PUBLICATIONS

Office Action issued in corresponding German Patent Application No. 10 2021 213 374.6, dated Aug. 5, 2022.

* cited by examiner

State of the art

DISK BRAKE SYSTEM WITH SINGLE-SIDED PRESSURE APPLICATION

CROSS-REFERENCE TO RELATED APPLICATION

Pursuant to 35 U.S.C. § 119 (a), this application claims the benefit of earlier filing date and right of priority to German Patent Application No. 102021213374.6, filed on Nov. 26, 2021, the contents of which are hereby incorporated by reference herein in its entirety.

The present invention is in the field of mechanical engineering. It relates to a disk brake system for a vehicle with single-sided pressure application.

Standard disk brake systems comprise a brake disk and a caliper holding two opposing brake pads. While these disk brake systems are generally considered to be effective, they have a number of known drawbacks. For example, the caliper of such brake systems is heavy and expensive. Drag torque is high because clearance has to be established for both brake pads simultaneously. Heat transfer to the environment is slow. Wear of the pads is non-constant.

In view thereof, it is an object of the present invention to solve at least some of the problems indicated above and suggest a brake system that is light-weight and/or avoids drag torque and/or reduces brake noises and/or increases braking performance.

This is achieved by a disk brake system according to claim 1. Advantageous embodiments can be found in the dependent claims and in the following description and the figures.

Accordingly, a disk brake system for a vehicle, with single-sided pressure application, is suggested. This disk brake system comprises a brake disk comprising a hub portion and a friction ring. A friction surface of the friction ring extends between an inner circumferential edge and an outer circumferential edge of the friction ring. The disk brake system furthermore comprises a housing with at least one piston for actuating a first brake pad. The first brake pad is configured to be pressed against the friction surface of the friction ring for braking. The disk brake system is devoid of an opposing brake pad opposite to the first brake pad. I.e., there is no brake pad that engages with a back surface of the friction ring, the back surface being opposite to the friction surface.

The single-sided pressure application envisioned in this brake system constitutes a complete turn away from known disk brake systems. Advantages of such a brake system may include light weight, since the housing can be designed much smaller than typical saddle-type calipers that extend around an edge of the brake disk. I.e., elimination of caliper finger side and caliper bridge is possible, according to this invention.

Typically, in embodiments of the brake system, the first brake pad is the only brake pad for the brake disk. This way, brake fluid volume absorption is minimized. Moreover, a pressure distribution between two brake pads is no longer necessary. This facilitates retraction of the brake pad and more precise resumption of a desired gap.

When mounted in a vehicle, the side of the friction surface is for instance the inner side of the brake disk, i.e., the side located towards a center of the vehicle. It is understood that it may be seen from the brake system itself, which side faces inward, and which side faces outward.

The brake system may be a half-floating brake system.

The brake system according to the invention thus may lead to significant reduction of drag torque squeal noises. It was found that several squeal modes, moan, and groan may disappear when pressure is applied only on the one side. The brake system can be lighter and cheaper compared to standard designs. Fuel consumption and $CO_2$ emissions can be reduced. The number of the components can be reduced, compared to a conventional brake system.

The brake system concept with single-sided pressure application may for instance be used in a hydraulic or electrical brake system.

Due to the novel design, it is possible to use a larger brake disc, filling the available space within the wheel. This is because the space between the outer circumferential edge of the friction ring and inner rim surface is now available, if the caliper bridge is dispensed of. Accordingly the brake disk may be ex-tended to a small distance from the rim, for instance less than 5 cm or less than 3 cm or less than 2 cm or less than 1 cm away from the rim, which space would otherwise be occupied by the brake caliper in disk brake systems according to the prior art.

The size of the brake pad in relation to the surface of the brake disk may be increased. The brake pad may for instance have a width that extends over 50% or at least 60% or at least 70% or at least 75% or at least 80% of a width of the friction surface of the friction ring. Advantageous cooling of the friction ring may be enabled through a back side of the friction ring as will be explained further below.

In the brake system, wear of the pad may be more easily controlled. It may be envisioned to use a large piston or more than one piston for the brake pad. For instance, in the disk brake system, the housing may have at least two pistons. In particular, there may be two pistons, three pistons, or four pistons, for actuating the first brake pad. Several pistons may be arranged next to each other along a circumference of the brake disk and/or along a radius of the brake disk.

The housing may for instance be made from cast iron, aluminium, or non-metallic materials.

In the brake system, it is possible to dispense of a pad spring.

The housing may be entirely located on the side of the friction surface of the brake disk, wherein it does not extend around an edge of the brake disk. This way, available space may be optimally used.

The friction surface of the brake disk may be configured such that the axis of rotation of the wheel and the brake disk represents the normal vector of the friction surface. However, in some embodiments it may be envisioned that the friction surface is oblique. Then, the friction surface is not normal to the axis of rotation. Instead, the friction surface forms a surface of a truncated cone. This may be achieved by having the outer circumferential edge of the friction surface displaced inward (with respect to a vehicle in which the brake system is mounted), as compared to the inner circumferential edge of the friction surface. To account for this, a movement of the first brake pad against the friction surface has a component in a circumferentially outward direction, (in addition to a component in an outward direction along the axis of rotation, with respect to the vehicle). The housing-design illustrated above allows sufficient free space to adjust the orientation of piston axis to be tilted by a small angle. Therein, the friction surface may be oblique at an angle $\alpha$ with respect to a surface that has an axis of rotation of the brake disk as a normal vector. The angle $\alpha$ may for instance be chosen between 0.5 and 5 degrees. In particular, the angle may be chosen between 0.5 degrees and 2 degrees.

In possible embodiments, the friction ring may have a decreasing thickness, from its inner circumferential surface towards its outer circumferential surface.

In the brake system, the friction ring may constitute a separate piece from the hub portion, wherein the friction ring is joined to the hub portion.

For instance, for joining the friction ring to the hub portion, the hub portion may engage with a back surface and/or an outer circumferential surface and/or an inner circumferential surface of the friction ring.

In possible embodiments, an interlayer may be disposed between the hub portion and the friction ring. For instance, the interlayer may be disposed over an entirety of a contact area between the hub portion and the friction ring, or it may be disposed only at the back surface of the friction ring.

The friction ring may for instance be made of grey cast iron. Additionally or alternatively, the hub portion may be made of aluminum.

The brake disk, in particular the friction ring may comprise cooling openings, such as cooling channels and/or holes. Alternatively, the brake disk may be designed as a non-ventilated brake disk. For instance, the friction ring may be solid, devoid of holes, channels, or openings. Due to the one-sided pressure application cooling can advantageously enabled through a back surface of the friction ring.

In possible embodiments of the brake system—designed as a ventilated or as a non-ventilated brake disk—a cooling ring may be provided at the back surface of the friction ring. This may provide additional cooling. The cooling ring typically has a higher thermal conductivity and/or heat transfer coefficient than the friction ring. For instance, the friction ring may be optimized for friction, and the cooling ring may be optimized for heat dissipation.

As stated above, the friction surface may be configured to face inward with respect to the vehicle, when the disk brake system is mounted within the vehicle. The first brake pad correspondingly being arranged and configured to move outward with respect to the vehicle for braking.

The housing may for instance be connected to a carrier, and the carrier may be connected to an axle component, such as a knuckle, for instance.

The invention also relates to a vehicle comprising at least one disk brake system according to any of the preceding claims. In particular, the vehicle may comprise two brake systems or four brake systems according to any of the embodiments explained herein.

The vehicle may in particular be a car or a truck.

Figure 2A:
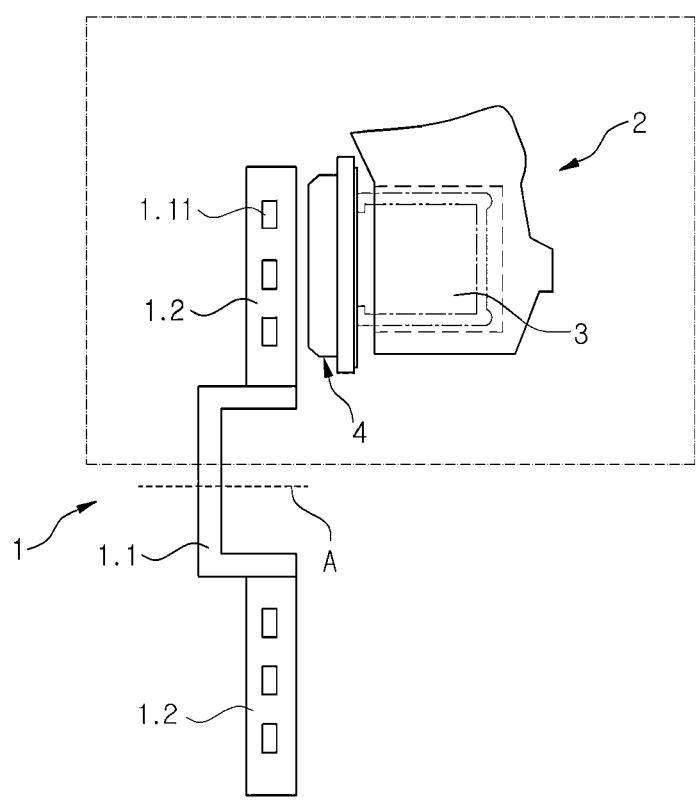
Figure 3A:
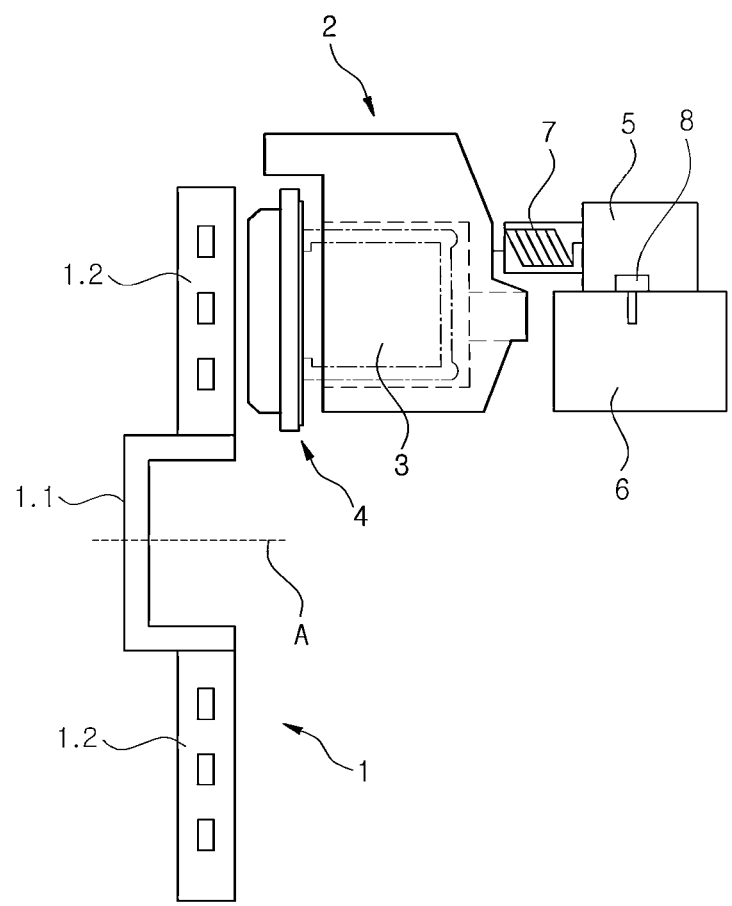
Figure 4:
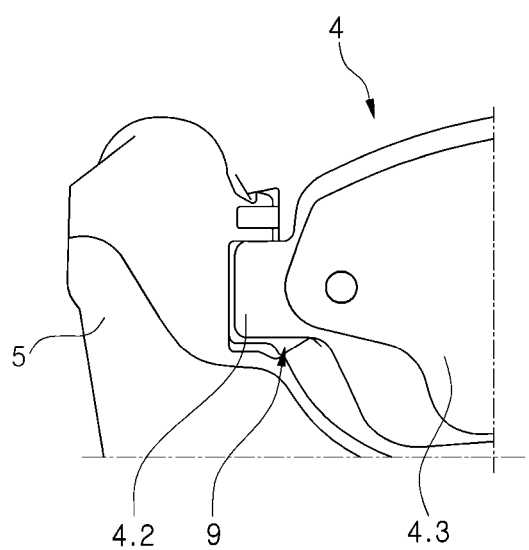
Figure 5A:
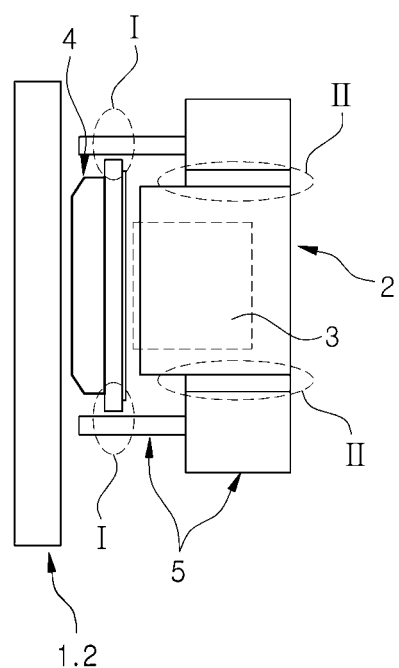
Figure 5B:
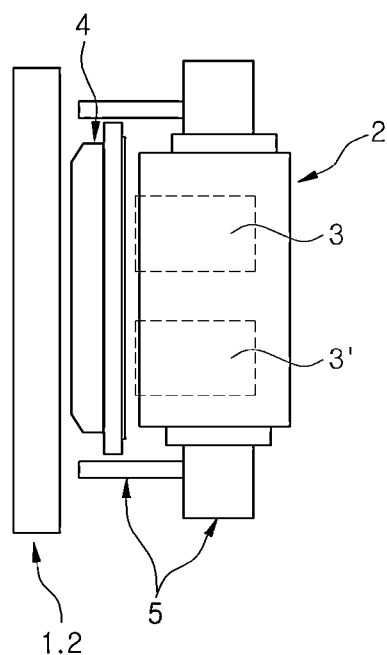
Figure 5C:
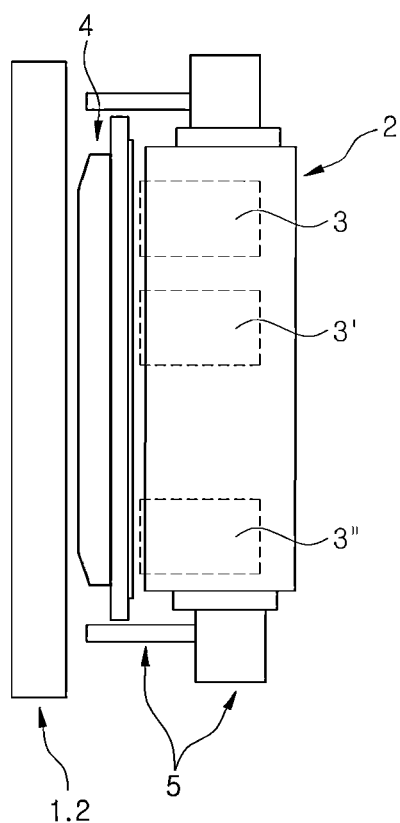
Figure 7A:
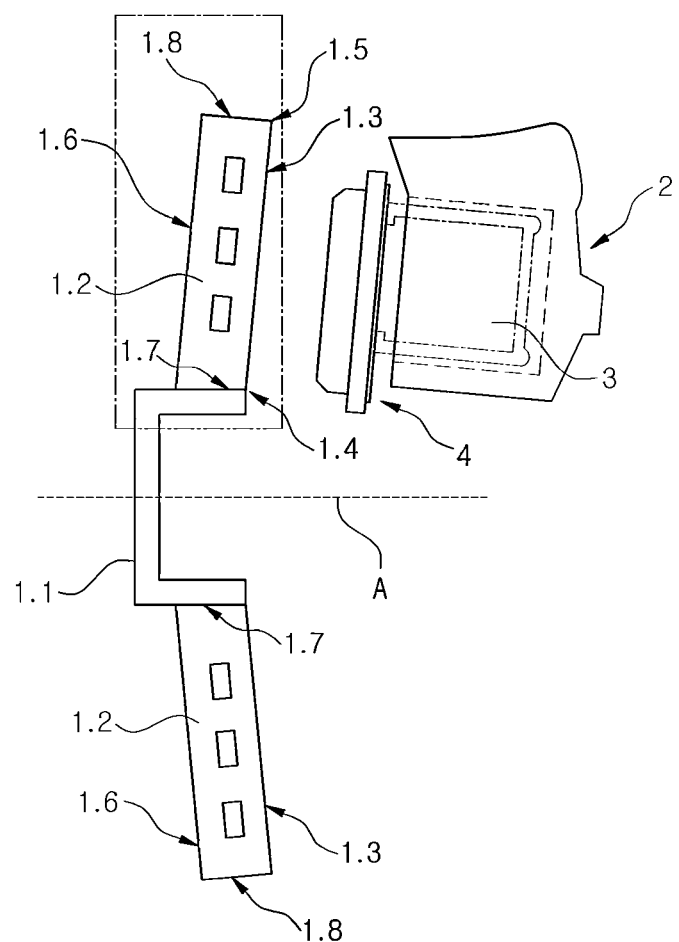
Figure 7B:
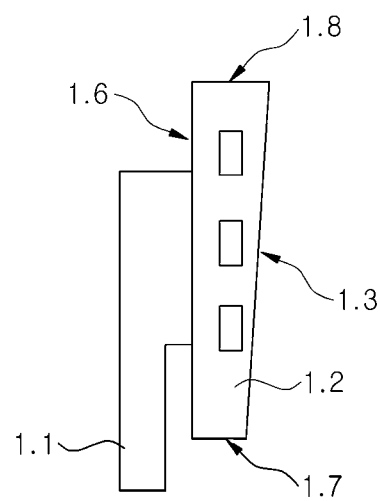
Figure 7C:
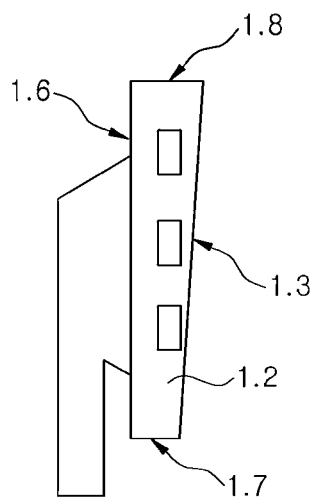
Figure 7D:
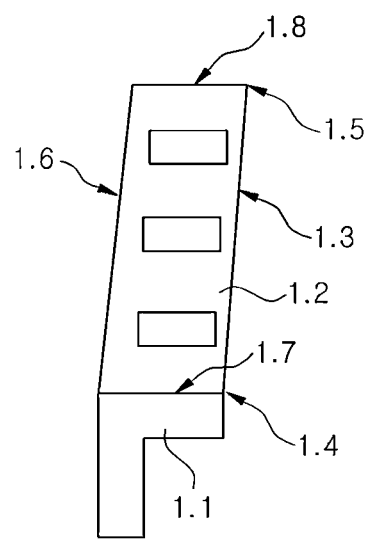
Figure 7E:
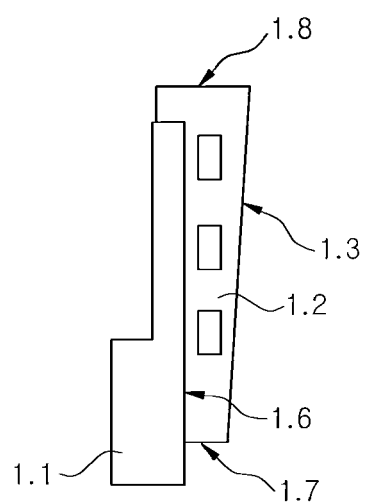
Figure 7F:
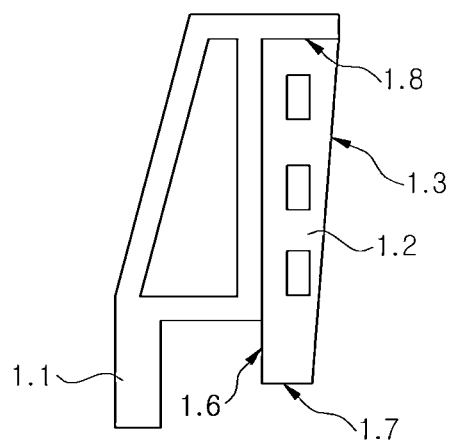
Figure 7G:
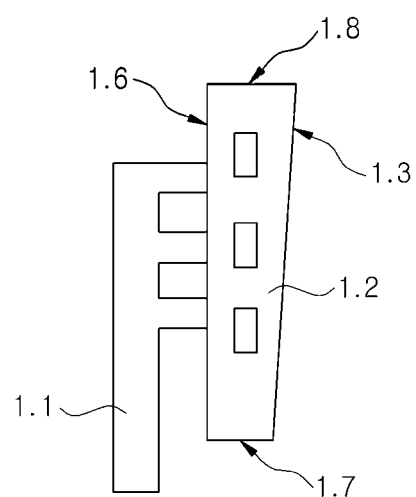
Figure 7H:
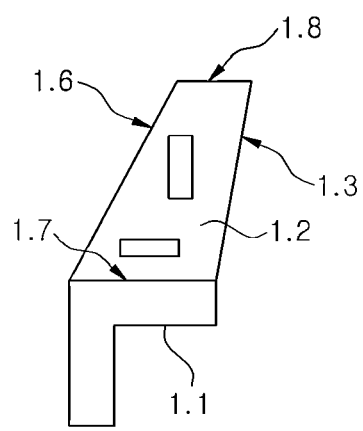
Figure 7I:
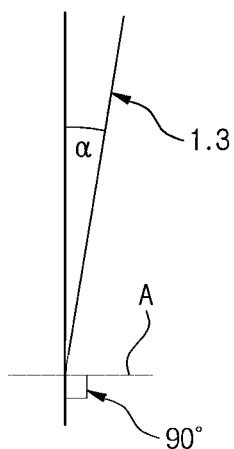
Figure 8A:
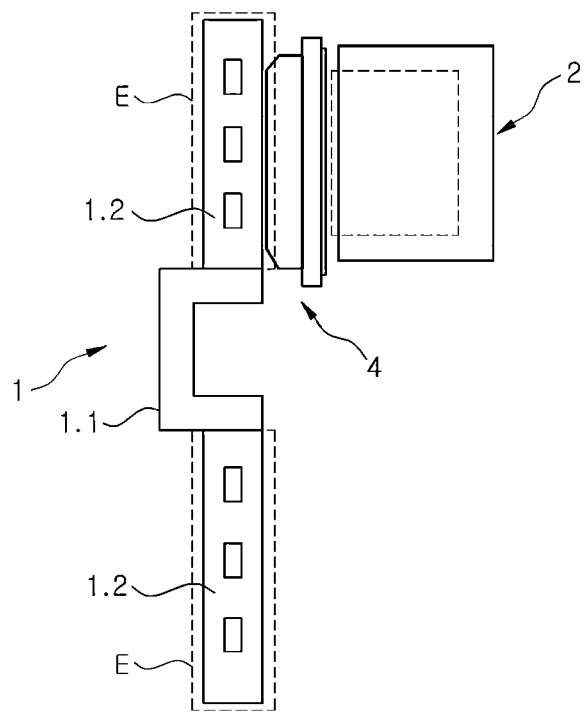
Figure 8B:
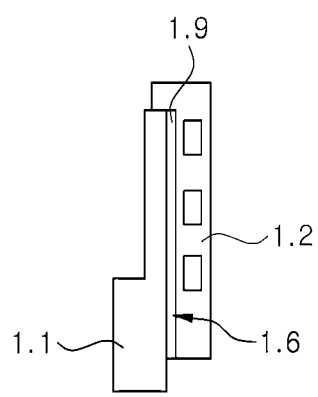
Figure 8C:
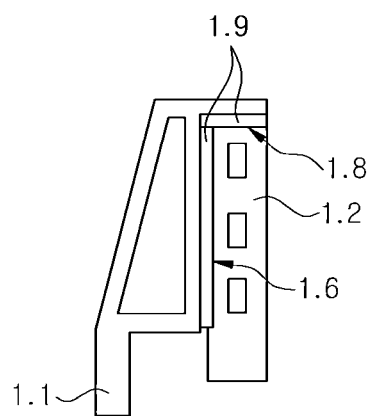
Figure 8D:
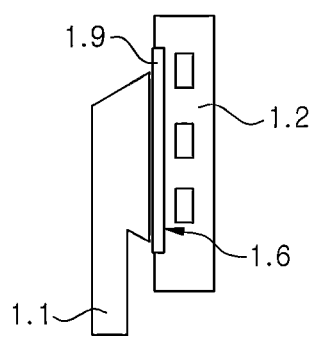
Figure 9:
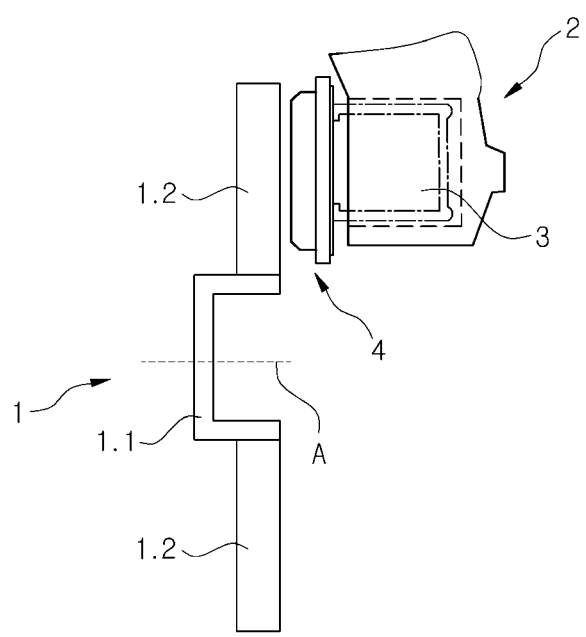
Figure 10:
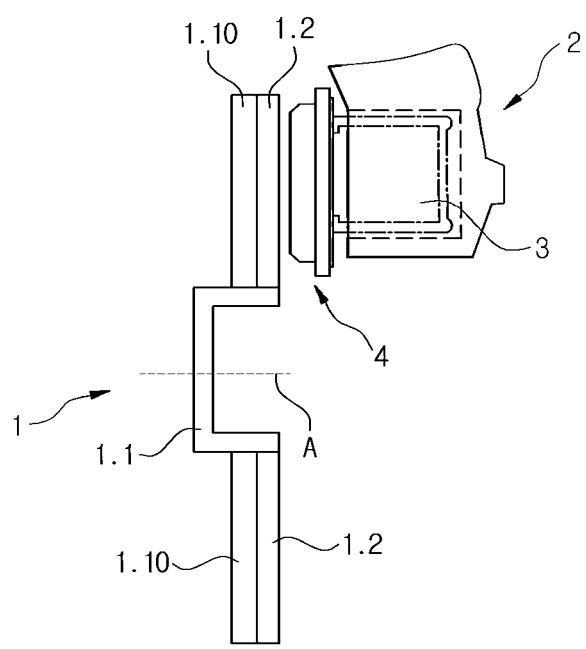

The invention is exemplarily explained with reference to the appended figures. Therein:

FIG. 1 shows a disk brake system according to the prior art,

FIGS. 2a, b show a brake system with single-sided pressure application, according to the invention, FIG. 3a, b schematically depict a connection of a brake system with single-sided pressure application to an axle component, FIG. 4 illustrates a connection of a brake pad to a carrier, for a brake system with single-sided pressure application, FIGS. 5a-c show embodiments of the brake system with single-sided pressure application, with one or more pistons, FIGS. 6a-h show different brake disk-setups for single-sided pressure application, FIGS. 7a-i different brake-disk-setups with an oblique friction surface, for single-sided pressure application, FIGS. 8a-d show brake-disk-setups with an interlayer between the hub-portion and the friction ring, FIG. 9 shows a brake system with single-sided pressure application, featuring a non-ventilated brake disk, and FIG. 10 shows a brake system with single-sided pressure application, with a brake disk having a friction ring and a cooling-ring.

FIG. 1 shows a disk brake system according to the prior art. It comprises a saddle-like caliper A, including a caliper bridge B and a caliper finger C. The caliper A includes a piston G. There is a brake disk D. Two opposing brake pads E, F are held by the caliper A. The two brake pads E, F are configured to be pressed against opposing sides of the brake disk D for braking.

Figure 2B:
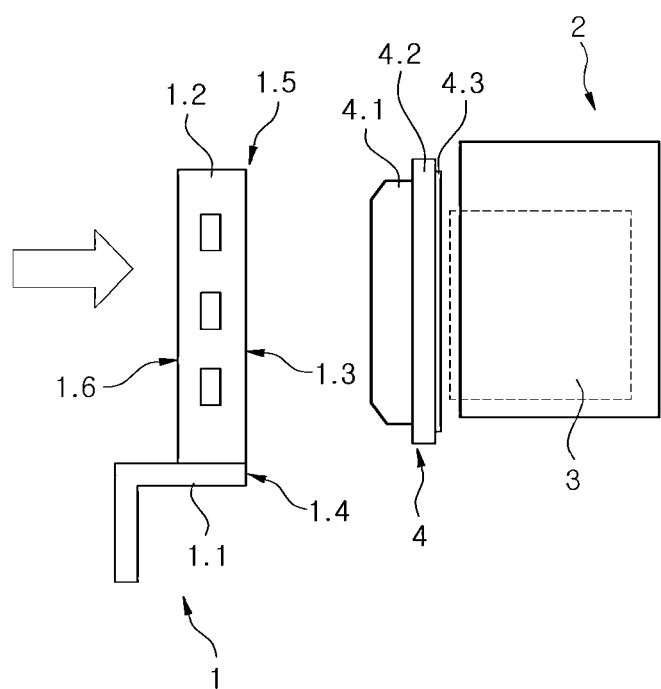

FIGS. 2a and b show a disk brake system according to the invention. It is a disk brake system for a vehicle, such as a car or a truck, with single-sided pressure application. The brake system comprises a brake disk 1 and only a single first brake pad 4 located on an inner side of the brake disk 1. The brake disk 1 is configured to rotate about an axis of rotation A. In FIG. 2a, a portion of the brake system is highlighted by a dashed-dotted box. This portion is schematically displayed again in an enlarged fashion in FIG. 2b. The brake disk 1 comprises a hub portion 1.1 and a friction ring 1.2. A friction surface 1.3 of the friction ring 1.2 extends between an inner circumferential edge 1.4 and an outer circumferential edge 1.5 of the friction ring 1.2. A housing of the brake system has a piston 3 for actuating the first brake pad 4. The first brake pad 4 is configured to be pressed against the friction surface 1.3 of the friction ring 1.2 for braking. The disk brake system is devoid of an opposing brake pad opposite to the first brake pad 4. I.e., a back surface 1.6 of the friction ring 1.2 remains free and there is no second brake pad configured to be pressed against it.

The housing 2 is entirely located on the side of the friction surface 1.1 of the brake disk 1 (inner side), and does not extend around an edge of the brake disk 1 or friction ring 1.2.

The friction ring 1.2 has optional ventilation openings 1.11 to enable cooling of the brake disk. As will be explained further here below, ventilation openings of this type may be dispensed with in brake systems of the type presented herein, because efficient cooling can be achieved through the back surface 1.6, which remains free and does not have a brake pad pressed against it.

The first brake pad 4 comprises a friction layer 4.1, a backplate 4.2, and a shim 4.3. The first brake pad 4 extends over a substantial portion of the friction surface 1.3, i.e. over more than 75% of a width of the friction surface, as measured from the inner circumferential edge 1.4 to the outer circumferential edge 1.5, thus enabling high stopping power.

Figure 3B:
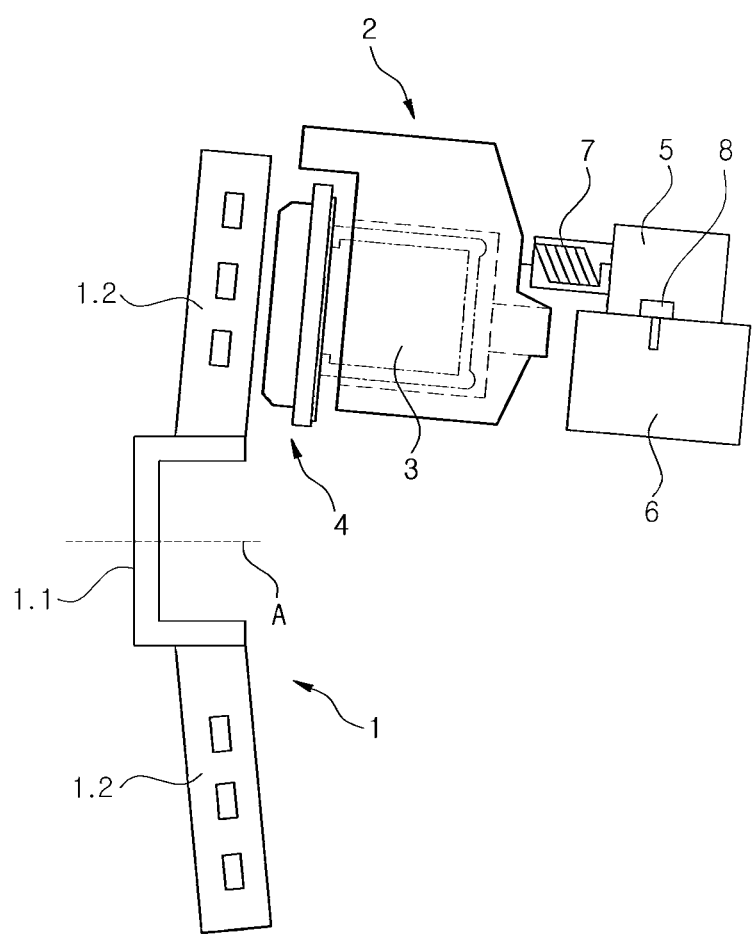

FIGS. 3a and 3b focus on schematically illustrating a connection of the housing 2 to an axle component of the vehicle in which the brake system is to be installed.

The disk brake system is designed such that the friction surface 1.3 is configured to face inward with respect to the vehicle, when the disk brake system is mounted within the vehicle. The first brake pad 4 is thus arranged and configured to move outward with respect to the vehicle for braking.

A vehicle may comprise at least one disk brake system according to any of the preceding claims. In particular, for example, a car or a truck, may comprise two brake systems or four brake systems according to any of the preceding claims. Two opposing brake systems, mirrored to each other, may be provided for the two front wheels and/or for the two rear wheels.

Once again, the housing 2 is entirely located on the side of the friction surface 1.3 of the brake disk 1, and does not extend around an edge of the brake disk 1 or friction ring 1.2.

The housing 2 is connected to a carrier 5, and the carrier 5 is connected to an axle component, namely a knuckle 6. The connection between housing 2 and carrier 5 may include a first connection element 7 which may be carried out as an elastic element or damping element which allows displacement of the housing with regard to the carrier 5. The connection between carrier and knuckle may comprise a second connection element 8, which is designed to establish a non-elastic connection between the carrier 5 and the knuckle 6. These connections establish a force path for transferring the forces generated when the brake pad 4 is pressed onto the brake disk 1. Through the carrier 5, the forces are transferred to the knuckle 6 and hence these forces will be absorbed by axle components.

In the case of FIG. 3b, the friction surface 1.3 of the brake disk 1 is oblique, such that the friction surface 1.3 forms a surface of a truncated-cone. To account for this, a movement of the first brake pad 4 against the friction surface 1.3 has a component in a circumferentially outward direction, and consequentially, the housing 2 and the carrier 5 are at an angle. In this case, it may be envisioned that the force is transferred into the axle components at an angle.

FIG. 4 exemplarily illustrates the connection between the brake pad 4 and the carrier 5. The brake bad 4 is slidably arranged in the carrier 5, to slide out of and into the plane of paper of FIG. 4. An optional pad spring 9 may be configured to aid retraction of the pad 4 after braking. In embodiments of the brake system shown herein, the pad spring 9 may be dispensed with.

FIGS. 5a to 5c further illustrate possible connections between the brake pad 4, the housing 2, and the carrier 5. The carrier 5 may be provided around the housing 2 and the brake pad 4. This enables, on the one hand, an axially sliding connection between carrier 5 and the brake pad 4 on two opposing sides (circled section I). On the other hand, this also enables an axially sliding connection between the carrier 5 and the housing 2 on two opposing sides (circled section II).

The housing 2 holds, in each case, at least one piston 3, 3', 3" for pressing against the brake pad 4 and moving the brake pad 4 against the friction ring 1.2 of the brake disk 1 for braking.

In the case of FIG. 5a, there is a single piston 3, which is arranged centrally. It is a large piston extending over more than half a length of the brake pad 4.

In the case of FIG. 5b, two pistons 3, 3' are provided next to each other. Further one or more pistons may be arranged in a second row parallel to the pistons 3, 3' that are visible in FIG. 5b.

As shown in FIG. 5c, there may be a first piston 3, a second piston 3', and an nth piston 3", n may be 3, 4, 5, for example. The n pistons may be arranged next to each other in a row. There may be one or more rows of further pistons.

FIGS. 6a-6h focus on the connection between the friction ring 1.2 and the hub portion 1.1. These types of connections may be envisioned in particular if the friction ring 1.2 is a separate piece from the hub portion 1.1, and the friction ring 1.2 is joined to the hub portion 1.1.

Figure 6A:
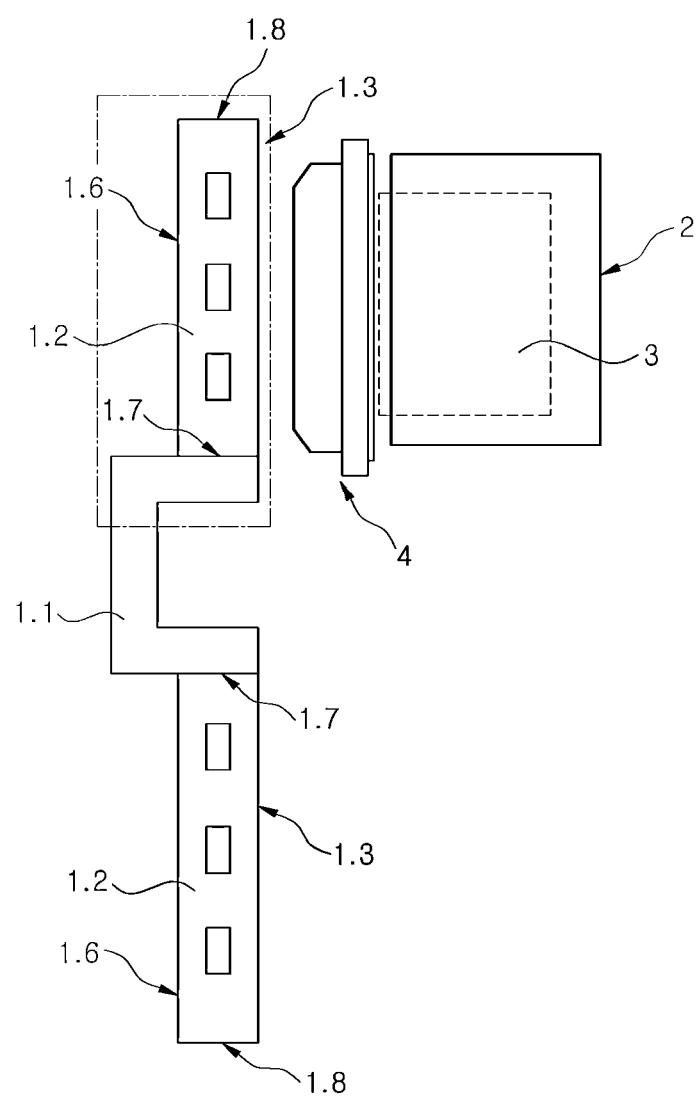

In FIG. 6a, a portion of the brake disk 1 is highlighted by way of a dashed-dotted box. This portion, carried out according to different possible embodiments, is displayed again in FIGS. 6b-6h.

With reference to all of the FIGS. 6a-6h, it may be said that the hub portion 1.1 engages with a back surface 1.6 and/or an outer circumferential surface 1.8 and/or an inner circumferential surface 1.7 of the friction ring 1.2.

Furthermore, with reference to all of the FIGS. 6a-6h the friction ring 1.2 may advantageously be made of grey cast iron and/or the hub portion 1.1 may be made of aluminum.

FIGS. 6a-6h exemplarily show ventilated brake disks 1. It is understood that they may, in each case, be configured as non-ventilated brake disks, devoid of cooling holes, channels or openings.

In the case of FIG. 6a, the hub portion 1.2 is attached to and engages with the inner circumferential surface 1.7 of the friction ring 1.2.

Figure 6B:
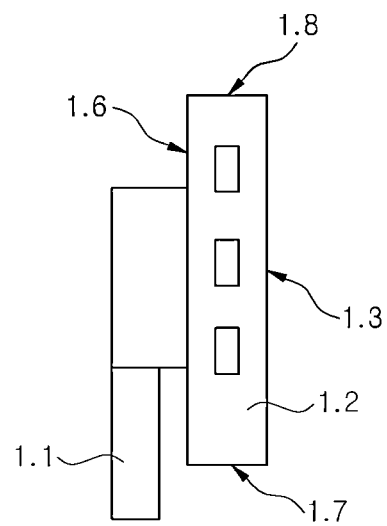
Figure 6C:
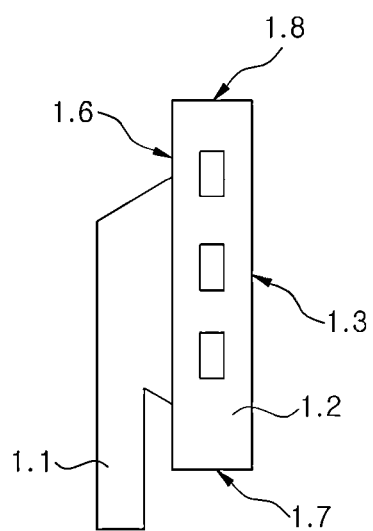

In the case of FIGS. 6b and 6c, the hub portion 1.1 is attached to and engages with the back surface 1.6 of the friction ring 1.2 The hub portion 1.1, in both cases, extends behind the back surface 1.6 of the friction ring 1.2 and has a protruding part extending towards the friction ring 1.2, the friction ring 1.2 being attached to the protruding part. In the case of FIG. 6c, the protruding part increases in width, toward the friction ring 1.2, providing increased surface for joining the two components.

Figure 6D:
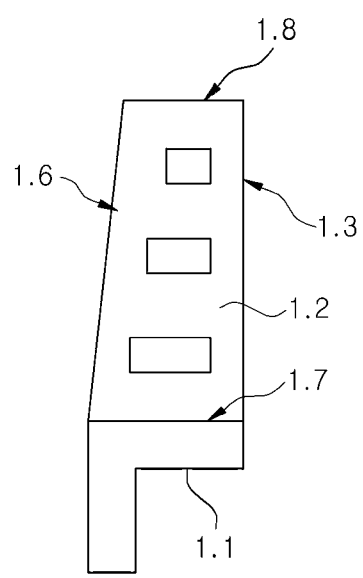

FIG. 6d shows an embodiment wherein the hub portion 1.1 is joined to the inner circumferential surface 1.7 of the friction ring 1.2, similarly to FIG. 6a. The back surface 1.6 of the friction ring is tapered, resulting in a slightly decreasing thickness of the friction ring 1.2 (by for instance 10-20%), from the inner circumferential surface 1.7 towards the outer circumferential surface 1.8.

Figure 6E:
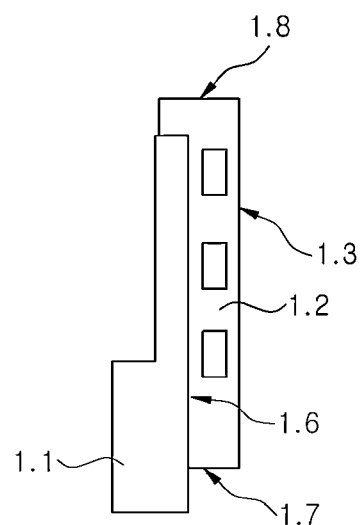

FIG. 6e shows an embodiment, wherein a recess is provided at the back surface 1.6 of the friction ring 1.2, the hub portion 1.1 extending into the recess and being joined to the friction ring 1.2 within the recess.

Figure 6F:
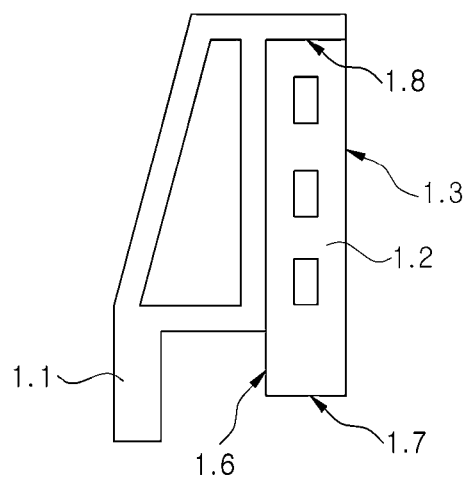

FIG. 6f shows an embodiment wherein the hub portion 1.1 extends around the friction ring 1.2 in a manner to engage and be attached to the outer circumferential surface 1.8 and the back surface 1.6 of the friction ring.

Figure 6G:
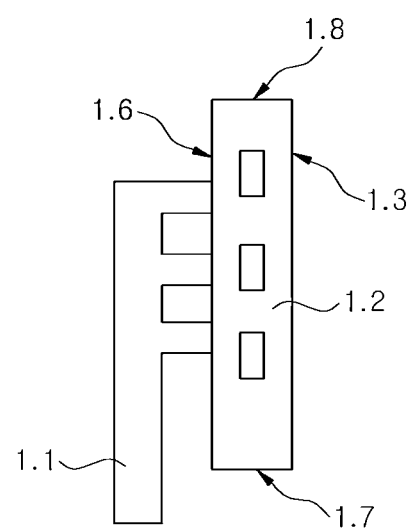

FIG. 6g shows an embodiment wherein the hub portion engages the back surface 1.6 of the friction ring 1.2, wherein the hub portion comprises three webs spaced apart from one another, the webs engaging and being attached to the friction ring 1.2. Improved cooling through the back surface 1.6 may be accomplished by way of this.

Figure 6H:
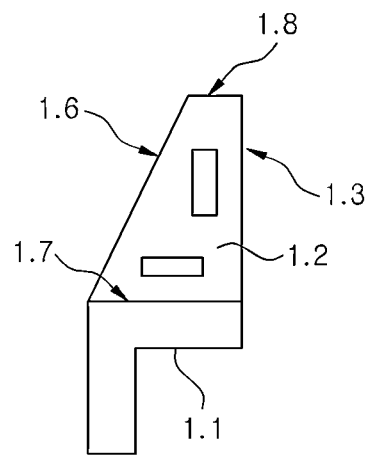

FIG. 6h shows another embodiment where the back surface 1.6 of the friction ring 1.2 is tapered, resulting in a decreasing thickness of the friction ring 1.2 (by over 50%), from the inner circumferential surface 1.7 towards the outer circumferential surface 1.8.

With reference to FIGS. 7a-7i, embodiments are explained wherein the friction surface 1.3 of the brake disk 1 is oblique, such that the friction surface 1.3 forms a surface of a truncated cone, and wherein a movement of the first brake pad 4 against the friction surface 1.1 has a component in a circumferentially outward direction. Reference is made to FIG. 3b and the explanations made in conjunction therewith. Again, cooling openings are optional. The outer circumferential edge 1.5 is in each case displaced inward along the axis of rotation A, with respect to the inner circumferential edge 1.4.

Furthermore, for the embodiments of FIGS. 7a-7h, reference is also made to FIGS. 6a-6h, insofar that the friction ring 1.2 is a separate piece from the hub portion 1.2, the friction ring 1.2 being joined to the hub portion 1.4. Again, the hub portion 1.1 engages with a back surface 1.6 and/or an outer circumferential surface 1.8 and/or an inner circumferential surface 1.7 of the friction ring 1.2. The friction ring 1.2 can be made of grey cast iron and/or the hub portion 1.1 can be made of aluminum.

Embodiments of FIGS. 7b and 7c are similar to the embodiments of FIGS. 6b and 6c. However, the friction ring 1.2 has an increasing thickness, continuously linearly increasing from the inner circumferential surface 1.7 towards the outer circumferential surface 1.8. This results in the oblique friction surface.

FIG. 7d shows an embodiment wherein the friction ring 1.2 has a constant thickness. The friction ring 1.2 is conically shaped, representing, in its entirety, a shell of a truncated cone. The outer circumferential edge 1.5 is again displaced inward with respect to the inner circumferential edge 1.4. This results in the oblique friction surface.

FIGS. 7e-7g are show embodiments similar to those of FIG. 6e-6g, the difference being once again an increasing thickness, continuously linearly increasing from the inner circumferential surface 1.7 towards the outer circumferential surface 1.8, resulting in the oblique friction surface 1.3.

FIG. 7h shows an embodiment with an oblique friction surface, wherein both the friction surface 1.3 and the back surface 1.6 are at an angle. Like in all the other cases shown in FIGS. 7a-7g, the angle for the friction surface 1.3 is such that the outer circumferential edge 1.5 is displaced inward along the axis of rotation A, with respect to the inner circumferential edge 1.4. Here, an angle exceeding the angle of the friction surface 1.3 is chosen for the back surface, resulting in a decreasing thickness of the friction ring 1.2, the thickness linearly decreasing from the inner circumferential surface 1.7 towards the outer circumferential surface 1.8. Overall, the oblique friction surface 1.3 is obtained in conjunction with an outwardly decreasing thickness of the friction ring 1.2.

Turning to FIG. 7i, with reference to the previous FIGS. 7a-7h, as well as FIG. 3b, an angle of the oblique friction surface 1.3 shall be illustrated and explained. The friction surface 1.3 is oblique at an angle α with respect to a surface that has the axis of rotation A of the brake disk 1 as a normal vector. The angles and surfaces in question are shown in FIG. 7i. The angle α may be chosen to be for instance at least 0.5 degrees and/or at most 5 degrees, or, preferably, at most 2 degrees. These values for α may be provided for any of the embodiments shown and explained herein, regardless of their further features.

By way of FIGS. 8a-8d, the issue of thermal expansion of the brake disk 1, in particular the friction ring 1.2 shall be illustrated and a solution according to an embodiment of the invention shall be explained. In FIG. 8a, a dashed-dotted box E illustrates a possible expansion of the friction ring 1.2

A solution to solve the issue of the thermal expansion of the friction ring 1.2 is envisioned, wherein an interlayer 1.9 in the form of a thermally isolating connection material is disposed between the hub portion 1.1 and the friction ring 1.2, as shown in FIGS. 8b-8d. The interlayer 1.9 helps to minimize the expansion in the direction towards the hob, and to increase the expansion towards the brake pad 4, which supports braking force and improves a pedal travel.

The interlayer 1.9 may be disposed at the backside 1.6 of the friction ring 1.2, as shown in FIGS. 8b-8d. The interlayer 1.9 may also be disposed at the outer circumferential surface 1.8, for instance, as shown in FIG. 8c.

FIG. 9 illustrates that in the disk brake system shown herein, the brake disk 1 may be a non-ventilated brake disk. I.e., the friction ring 1.2 may be devoid of openings, channels, or holes for cooling. This is to be said with reference to the embodiments of all previous FIGS. 2a through 8d, for each of which, ventilation is optional. Thanks to the back side 1.6 of the friction ring 1.2 being free of a brake pad, heat may be dissipated through the back side 1.6, for instance.

FIG. 10 illustrates a further embodiment of a non-ventilated brake disk, wherein the friction surface 1.2 is devoid of openings, channels, or holes for cooling. To enhance cooling through the back surface, a cooling ring 1.10 is provided at the back surface 1.6 of the friction ring 1.2. The cooling ring 1.10 has a higher thermal conductivity and heat transfer coefficient than the friction ring 1.2. The cooling ring 1.10 also has a higher thermal expansion coefficient than the friction ring 1.2. The friction ring 1.2 may be grey cast, and optimized for a high friction value. The cooling ring 1.10 on the other hand, is made of a different material and may be optimized for high heat transfer. The cooling ring 1.10 may even be provided in addition to the interlayer 1.9.

LIST OF REFERENCE NUMERALS 1 brake disk
1.1 hub portion
1.2 friction ring
1.3 friction surface of the friction ring
1.4 inner circumferential edge of the friction ring
1.5 outer circumferential edge of the friction ring
1.6 back surface of the friction ring
1.7 inner circumferential surface of the friction ring
1.8 outer circumferential surface of the friction ring
1.9 interlayer
1.10 cooling ring
1.11 ventilation opening
2 housing
3, 3', 3" piston
4 first brake pad
4.1 friction layer
4.2 backplate
4.3 shim
5 carrier
6 knuckle/axle component
7 first connection element
8 second connection element
9 pad spring
A axis of rotation
α angle of oblique friction surface

The invention claimed is:

1. A disk brake system for a vehicle, with single-sided pressure application, comprising
a brake disk comprising a hub portion and a friction ring, a friction surface of the friction ring extending between an inner circumferential edge and an outer circumferential edge of the friction ring,
a housing with at least one piston for actuating a first brake pad,
the first brake pad being configured to be pressed against the friction surface of the friction ring for braking, the disk brake system being devoid of an opposing brake pad opposite to the first brake pad,
wherein the housing is placed on one side of the friction ring with respect to a radial direction of the brake disk based on the hub portion.

2. The disk brake system according to claim 1, wherein the friction ring is a separate piece from the hub portion, the friction ring being joined to the hub portion.

3. The disk brake system according to claim 2, wherein the hub portion engages with a back surface and an outer circumferential surface or an inner circumferential surface of the friction ring.

4. The disk brake system according to claim 2, wherein an interlayer is disposed between the hub portion and the friction ring.

5. The disk brake system according to claim 2, wherein the friction ring is made of grey cast iron and the hub portion is made of aluminium.

6. The disk brake system according to claim 1, wherein the first brake pad is an only brake pad for the brake disk.

7. The disk brake system according to claim 1, wherein the housing is entirely located on a side of the friction surface of the brake disk, and does not extend around an edge of the friction ring.

8. The disk brake system according to claim 1, wherein the friction surface of the brake disk is oblique, such that the friction surface forms a surface of a truncated cone, wherein a movement of the first brake pad against the friction surface has a component in a circumferentially outward direction.

9. The disk brake system according to claim 1, wherein the brake disk is designed as a non-ventilated brake disk.

10. The disk brake system according to claim 1, wherein a cooling ring is provided at a back surface of the friction ring, the cooling ring having a higher thermal conductivity and heat transfer coefficient than the friction ring.

11. The disk brake system according to claim 1, wherein the friction surface is configured to face inward with respect to the vehicle, when the disk brake system is mounted within the vehicle, the first brake pad being arranged and configured to move outward with respect to the vehicle for braking.

12. The disk brake system according to claim 1, wherein the housing is connected to a carrier, and the carrier is connected to a knuckle.

13. A vehicle comprising at least one disk brake system according to claim 1.

* * * * *